(12) United States Patent
Rafie et al.

(10) Patent No.: US 6,628,707 B2
(45) Date of Patent: Sep. 30, 2003

(54) ADAPTIVE EQUALIZER SYSTEM FOR SHORT BURST MODEMS AND LINK HOPPING RADIO NETWORKS

(75) Inventors: Manouchehr S. Rafie, Sunnyvale, CA (US); Jun Lu, San Jose, CA (US); Dengwei Fu, Cupertino, CA (US); Tushar Shah, Milpitas, CA (US)

(73) Assignee: Radiant Networks PLC, Little Chesterford (GB)

( * ) Notice: Subject to any disclaimer, the term of this patent is extended or adjusted under 35 U.S.C. 154(b) by 0 days.

(21) Appl. No.: 09/849,687

(22) Filed: May 4, 2001

(65) Prior Publication Data

US 2002/0196844 A1 Dec. 26, 2002

(51) Int. Cl.$^7$ ................................. H03H 7/40
(52) U.S. Cl. ................... 375/233; 375/350; 708/304; 708/305; 708/323
(58) Field of Search .................. 375/229–234, 375/350; 708/305, 304, 322, 323

(56) References Cited

U.S. PATENT DOCUMENTS

| | | | |
|---|---|---|---|
| 3,878,468 A | | 4/1975 | Falconer et al. |
| 3,974,449 A | | 8/1976 | Falconer |
| 4,253,184 A | | 2/1981 | Gitlin et al. |
| 4,422,175 A | | 12/1983 | Bingham et al. |
| 5,014,283 A | | 5/1991 | Baier |
| 5,063,573 A | | 11/1991 | Langewellpott |
| 5,163,066 A | | 11/1992 | Cupo et al. |
| 5,283,813 A | | 2/1994 | Shalvi et al. |
| 5,406,586 A | | 4/1995 | Wang |
| 5,418,817 A | | 5/1995 | Richter |
| 5,483,557 A | | 1/1996 | Webb |
| 5,530,485 A | * | 6/1996 | Kim et al. ................. 348/611 |
| 5,533,050 A | | 7/1996 | Isard et al. |
| 5,539,774 A | * | 7/1996 | Nobakht et al. .............. 333/18 |
| 5,615,233 A | * | 3/1997 | Baum et al. ................. 375/232 |
| 5,646,957 A | * | 7/1997 | Im et al. .................... 375/233 |
| 5,694,424 A | * | 12/1997 | Ariyavisitakul ............. 375/232 |
| 5,712,873 A | * | 1/1998 | Shiue et al. ................ 375/230 |
| 5,717,717 A | * | 2/1998 | Yang et al. ................ 370/320 |
| 5,737,327 A | | 4/1998 | Ling et al. |
| 5,799,037 A | | 8/1998 | Strolle et al. |
| 5,799,047 A | | 8/1998 | Dobrica |
| 5,844,943 A | | 12/1998 | Kazecki et al. |
| 5,875,215 A | | 2/1999 | Dobrica |
| 5,878,085 A | | 3/1999 | McCallister et al. |
| 5,909,466 A | | 6/1999 | Labat et al. |
| 5,999,223 A | | 12/1999 | Patel et al. |
| 6,028,929 A | * | 2/2000 | Laberteaux ................. 370/291 |
| 6,067,319 A | | 5/2000 | Copeland |
| 6,078,614 A | * | 6/2000 | Brown et al. ................. 360/65 |
| 6,081,549 A | | 6/2000 | Shou et al. |

FOREIGN PATENT DOCUMENTS

| | | |
|---|---|---|
| EP | 0 117 626 A2 | 1/1984 |
| EP | 0 347 394 A1 | 4/1989 |
| WO | WO 99/23796 | 5/1999 |

* cited by examiner

Primary Examiner—Stephen Chin
Assistant Examiner—Dac V. Ha
(74) Attorney, Agent, or Firm—Pillsbury Winthrop LLP

(57) ABSTRACT

A method for an adaptive equalization apparatus in a multiple-link hopping radio system includes hopping among a plurality of radio links to receive variable-length bursts of radio signals on the plurality of radio links and equalizing amplitude and phase variations of a slow channel for each radio link from a received burst on the radio link. Further, the method includes storing the estimated tap coefficients pertinent to each radio link and using the tap weights of the current burst of the radio link to reliably pre-compensate the channel amplitude and phase distortion of a next received burst on the radio link.

26 Claims, 6 Drawing Sheets

PRIOR ART

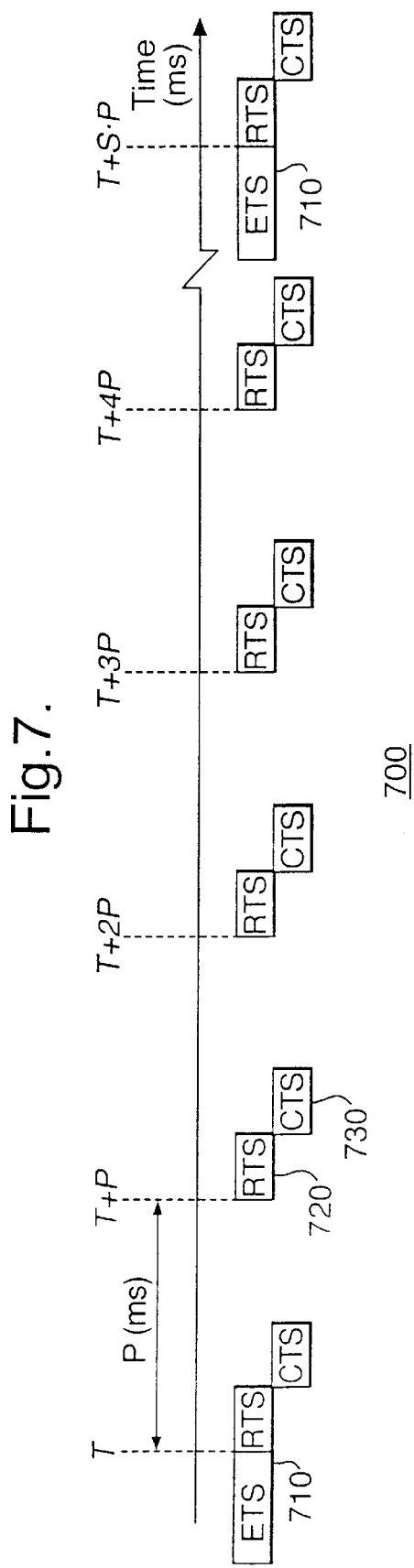

ADAPTIVE EQUALIZER SYSTEM FOR SHORT BURST MODEMS AND LINK HOPPING RADIO NETWORKS

RELATED APPLICATIONS

This application is related to application Ser. No. 09/764,202, filed Jan. 17, 2001 in the names of M. Rafie, et al., and entitled "Carrier Recovery System For Adaptive Modems and Link Hopping Radio Networks."

BACKGROUND OF THE INVENTION

This invention relates to an adaptive equalizer subsystem employed in fixed broadband wireless access (FBWA) applications operating in adaptive short-burst modems and multi-link hopping mesh radio networks over slow time-varying channels. The adaptive modem is capable of fast link-hopping from one link to another over such channels. That is, the channel is quasi-static from burst to burst for any given link.

The embodiments described herein may be used in conjunction with a wireless mesh topology network of the type described in U.S. patent application Ser. No. 09/187,665, entitled "Broadband Wireless Mesh Topology Networks" and filed Nov. 5, 1998 in the names of J. Berger and I. Aaronson, with carrier phase recovery system described in U.S. patent application Ser. No. 09/764,202, entitled "Carrier recovery System for Adaptive Modems and Link Hopping Radio Networks" and filed in the names of M. Rafie et al., and with network nodes including switched multi-beam antenna designs similar to the design described in U.S. patent application Ser. No. 09/433,542, entitled "Spatially Switched Router for Wireless Data Packets" and filed in the names of J. Berger, et al., as well as with the method and apparatus disclosed in U.S. patent application Ser. No. 09/699,582 entitled "Join Process Method For Admitting A Node To A Wireless Mesh Network, filed Oct. 30, 2000 in the names of Y. Kagan, et al. Each of these U.S. patent applications is incorporated in its entirety herein by reference. Other applications for the embodiments will be apparent from the description herein.

Burst transmission of digital data is employed in several applications such as satellite time-division multiple access, digital cellular radio, wide-band mobile systems and broad-band wireless access systems. The design trade-offs and the resulting architectures are different in each of these applications.

In general, the receiver must filter the received burst waveforms in a way that will result in the best possible bit-error performance. In most cases, this means maximizing the ratio of signal power to power of noise, interference, and distortion. In modern systems, this implies using a matched filter or an adaptive equalizer.

In most of these applications, a preamble of known symbols is inserted in the beginning, middle, or at end of each burst of data packets for training purposes. Such an approach is not appropriate in applications involving transmission of short bursts. The insertion of a known data sequence greatly reduces the transmission efficiency for a short burst. As a result, preamble-based algorithms are not applicable in such systems.

Ideally, it is highly desirable to minimize the use of training sequences for initial acquisition or subsequent adaptation. This property is especially important for short-burst formats used in many existing wireless communication applications that utilize Time-Division Multiple Access (TDMA) such as IS-136, GSM, EDGE, and fixed broadband wireless access systems. Short burst formats are used to reduce end-to-end transmission delay and to limit the time variation of wireless channels over a burst. However, training overhead can be very significant for such short burst formats. This overhead ranges up to 30% in many systems. The overhead of these systems can be recovered by employing the adaptive equalization apparatus outlined in this invention. In cases where longer range or higher tolerance of delay spread is needed, adaptive equalization can be used for these systems without changing physical link formats.

A constant need for ever-increasing throughputs through fixed bandwidths, fueled by broadband Internet protocol (IP) applications, has pushed system designers toward more throughput-efficient modulation schemes. Because of their relatively good performance, large quadrature amplitude modulation (QAM) constellations are being used in many of these applications. One of the critical problems associated with the use of large QAM constellations is that of amplitude and delay distortion of the radio link, which for efficiency reasons, must often be done without the use of a preamble, particularly in burst modem systems.

There are several classes of approaches to adaptive equalization. Low complexity algorithms for adaptation, such as the least mean-square (LMS) error algorithms, are fairly common in adaptive equalizers. Faster approaches, such as the least-squares (LS), recursive least-squares (RLS), fast Kalman, and square-root RLS methods, require computationally-intensive matrix inversions and (in some cases) stability issues. Adaptive equalizers can be further classified into linear transversal and recursive structures.

In transversal (tap-delay-line) equalizers, the current and past values of the received symbols, r(t-nT), are linearly weighted by equalizer tap coefficients (tap gains) c(n) and summed to produce the equalized signal, $$y(n) = \sum_k c(k) r(t_0 + nT - kT).$$

A zero-forcing (ZF) equalizer minimizes the peak distortion of the worst case ISI (inter-symbol interference) only if the peak distortion before equalization is less than 100 percent. In an LMS equalizer, however, the equalizer tap coefficients are chosen to minimize the mean-square error—the sum of squares of all the ISI (inter-symbol interference) terms plus the noise power at the output of the equalizer.

Under the class of non-linear receiver structure, various optimality criteria related to error probability are considered. This culminated in the development of the maximum likelihood sequence estimator (MLSE) using the Viterbi algorithm (VA) and adaptive version of such a receiver. The computational complexity of the MLSE is proportional to $m^{L-1}$, which grows exponentially with symbol alphabet size (m) and the number of terms in the discrete channel pulse response (L). Another branch of non-linear and sub-optimal receiver structure is the decision-feedback equalizer (DFE). A decision-feedback equalizer makes memoryless decisions and cancels all trailing inter-symbol interference (ISI) terms. DFE, however, suffers from a reduced effective signal-to-noise ratio (SNR) and error propagation, due to its inability to defer decisions.

Fast convergence is important for adaptive equalizers in receivers polling multi-point networks where each node in the network must adapt to receive typically short bursts of data from a number of transmitters over different radio links. Orthogonalized LMS algorithms are used to speed up equalizer convergence. In particular, a self-orthogonalization technique, such as RLS and adaptive lattice (AL) are used for rapidly tracking adaptive equalizers. Kalman (RLS) and fast Kalman algorithms obtain their fast convergence by orthogonalizing the adjustment made to the coefficients of an ordinary linear transversal equalizer. Adaptive lattice algorithms, on the other hand, use lattice filter structure to orthogonalize a set of received signal components. In some applications, use of fast converging equalizers are avoided due to computational complexity and stability issues.

If the impairments that the equalizer must resolve are small enough so that the modem can successfully track timing and carrier phase prior to equalization, then the equalizer can be made to train much more rapidly. For more severely distorted channels, an approach that trains the equalizer prior to recovery of timing and carrier may be needed.

The effect of carrier phase error, $\phi_e = \phi - \hat{\phi}$, in high-level modulation schemes, such as M-QAM is to reduce the power of the desired signal component by a factor of $\cos^2(\phi - \hat{\phi})$ in addition to the cross-talk interference from the in-phase and quadrature components. Since the average power level of the in-phase and quadrature components is the same, a small phase error causes a large degradation in performance of the adaptive equalizer, particularly at higher modulation levels (i.e., $M \geq 16$). An accurate carrier phase recovery unit described in U.S. patent application Ser. No. 9/764,202, entitled "Carrier recovery System for Adaptive Modems and Link Hopping Radio Networks" and filed on Jan. 17, 2001 in the names of M. Rafie, et al., is used following a non-adaptive pre-equalizer and before two adaptive equalizers in order to reduce the adverse impact of the carrier phase offset on the performance and the convergence of the adaptive equalizer.

In continuous modem applications, the user is typically willing to wait a time period while the receiver goes through an acquisition phase in which tracking processes adapt the tap coefficients of the equalizer. Often, the tap-convergence process in a continuous modem simply allows the adaptive equalizer to keep on tracking the channel impulse response and the undesired noise (interference plus noise) continuously based on the received signal. In other words, the acquisition processing is not different from the tracking processing.

In contrast, in a burst modem, the user data content of a given transmission may be only a fraction of a millisecond. Long acquisition times contribute an unacceptable level of overhead to the system and substantially reduce capacity. Thus, the burst modem requires a special acquisition process that will quickly estimate the appropriate receiver gain, the carrier frequency and phase, the sample timing frequency and phase, and the tap coefficients for an equalizer of the receiver. Also, the acquisition process must reliably identify which bit in the burst is the first user data bit so that higher layers of the protocol stack can format data properly.

The initial tap coefficient values can be estimated using a training sequence in the join (acquisition) mode of the system. A QPSK signaling sequence may be used in the join mode to compensate the amplitude and delay distortion of each individual radio link. The tap coefficient values may then be used as the initial tap weights for the fixed pre-equalizer and the iterative adaptive equalizer as will be described in the sequel Conventional equalization in wireless communications requires frequent transmission of training sequences. This represents a system overhead and effectively reduces the information rate. On the other hand blind equalization techniques do not require training sequences. One of the most popular blind algorithms is the family of constant modulus algorithm (CMA). There are several disadvantages in using the CMA family of algorithms. One of them is the existence of local minima. Another drawback of blind algorithm is the slow convergence and inability to achieve equalization in a short burst.

Hence, there is a need for a method and apparatus for an adaptive equalizer technique in a burst-mode system. Further, there is a need for a method and apparatus for an adaptive equalization technique in a link-hopping system using short transmission bursts for radio communication.

BRIEF SUMMARY

By way of introduction only, the present embodiments provide a method for receiving radio signals in a multiple-link hopping radio system. The method includes hopping among a plurality of radio links to receive short bursts and compensating for amplitude and delay distortion for each radio link. Further, the method includes storing the estimated tap coefficients of an adaptive equalizer and using these tap coefficient values as initial tap weight values for a next received burst on the radio link.

The embodiments further provide a method for receiving radio signals which includes receiving a first burst on a first radio link and determining channel information (i.e., estimating the tap coefficients of the equalizer) about the first radio link using the first burst. The method further includes receiving a next burst such as a second burst of the first radio link using the estimated tap coefficients from the first burst as the initial tap values of the equalizers for the second burst of the first radio link.

The embodiments further provide an adaptive equalization method for use in a multiple-link hopping, burst adaptive modem. The method includes receiving modulated amplitude and delay distorted signals as a series of bursts. The system comprises a fixed fractionally-spaced equalizer configured to equalize a present burst of data using equalizer weights from a previous burst of data generated by an adaptive equalizer per radio link. Further, the method includes estimating and removing the carrier phase offset from the pre-equalized burst.

The embodiments further include an iterative adaptive equalizer unit consisting of two adaptive fractionally-spaced equalizers which equalize the present burst to produce an equalized output signal and provides next burst equalizer weights to a fixed equalizer for equalizing a next burst of data.

The embodiments further provide an adaptive equalization system for use in a multiple-link hopping and burst adaptive modem in steady-state operation. In one embodiment, the adaptive equalization system includes a memory unit and a fixed equalizer for equalizing a present data burst of a present link for which the stored tap coefficients pertains to a previous burst. The adaptive equalizer unit includes a first stage that pre-compensate the amplitude and phase distortion of each radio link using a fixed equalizer in the received burst of data, a carrier phase offset removal stage coupled to the first stage and an iterative adaptive equalizer stage coupled to the carrier phase removal stage. The iterative adaptive equalizer is composed of two fractionally-spaced adaptive equalizers. The first adaptive equalizer is required to provide initial tap estimates for the second adaptive equalizer. The adaptive equalizer system further includes a memory unit for storing the tap coefficient values of the final stage of the adaptive equalizer operated on the current burst of the present radio link. Further, the stored tap coefficients are down loaded into the fixed equalizer of the first stage of the invention to pre-compensate the amplitude and delay variations of the incoming next burst of the present radio link.

The foregoing discussion of the preferred embodiments has been provided only by way of introduction. Nothing in this section should be taken as a limitation on the following claims, which define the scope of the invention.

BRIEF DESCRIPTION OF THE SEVERAL VIEWS OF THE DRAWINGS

FIG. 7 illustrates frame construction of a transmitted equalizer training sequence (ETS) in the wireless network of FIG. 1.

DETAILED DESCRIPTION OF THE PRESENTLY PREFERRED EMBODIMENTS

Figure 1:
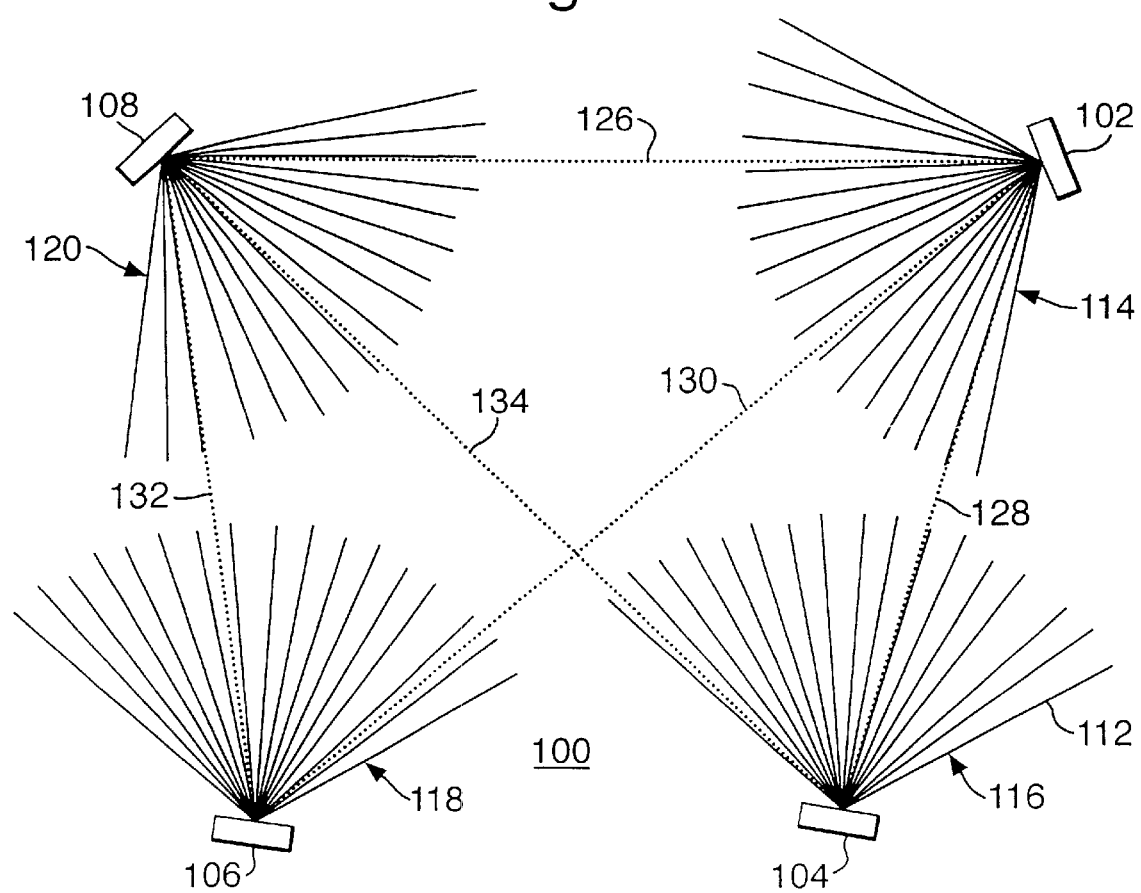
FIG. 1 is a block diagram of a link hopping wireless network having a mesh topology.

A method for an adaptive equalizer apparatus in a multiple-link hopping wireless system includes hopping among a plurality of radio links to receive short bursts and equalizing amplitude and delay distortion for each radio link from a received burst on the radio link. The adaptive equalizer method and apparatus use multi-stage equalization techniques consisting of a fixed equalizer and two adaptive equalizers to compensate for the amplitude and phase impairment of each individual link of the available multiple links independently on a burst-per-burst basis. Since the adaptive equalizer performance is highly dependent on the channel behavior of the particular link, a means is provided to pre-compensate coarsely the undesired channel characteristic and to remove the carrier phase offset of the received burst of each link independently prior to any adaptive equalization processing schemes. For each radio link of a plurality of multiple hopping links, the tap-coefficient values of an adaptive equalizer corresponding to the current burst are stored and will be used in a fixed equalizer to pre-equalize the received next burst. For each burst within a given link, a multi-stage carrier phase recovery system is used to remove any carrier phase offset to allow a faster convergence of the adaptive algorithms employed in the equalizer system. The adaptive equalizer operates in an acquisition (join) mode as well as in a steady-state (burst) mode.

The present embodiments relate to the adaptive equalizer subsystem for a link-hopping wireless mesh topology architecture used for fixed, broadband wireless access networks. Such networks operate in different spectra such as in the Local Multi-point Distributed Service (LMDS) band at 28 GHz. The modem of a node in such a network is capable of fast link hopping from one link to another over slow time-varying channels. That is, the channel is quasi-static from burst to burst for any given link. A multi-stage adaptive equalizer technique is provided for a coherent detection and equalization of a high-speed short-burst multi-link hopping mesh network topology using, for example, fixed broadband wireless access.

Fading in fixed line-of-sight (LOS) channels, although mild compared to mobile systems, provides disruptive effects for amplitude and phase tracking. The use of RLS, fast Kalman, or blind algorithms for equalizer systems are not appropriate for short-burst modem applications. These adaptive techniques fail to provide improved performance due to the large cycle-slip rate in fading channels, complexity and instability of the algorithms, and/or slow convergence rate in short-burst broadband applications.

The present embodiments are designed to enhance performance as compared to traditional adaptive equalization schemes through employing fast and efficient algorithms suitable for variable-length short-burst modems with a variable-QAM modulation signaling, while maintaining low-implementation complexity and high-throughput efficiency. A multi-stage adaptive equalization technique along with a carrier phase offset estimation subsystem are the scope of this embodiment for compensating the amplitude and delay distortion of the transmitted signal in a time-varying channel environment involving a dynamic mesh networks employing high-speed, short-burst data using adaptive QAM modulation schemes.

To achieve coherent detection in a short-burst fading channel and high-speed speed mesh infrastructure, a reliable carrier-phase recovery method and an agile equalization technique must be performed. In principle, non-aided and non-adaptive schemes alone are most efficient, however, their performance becomes critical even for a very robust modulation signaling (i.e., B/QPSK) when operating in low signal-to-noise ratio (SNR) and/or the channel is impaired by fading.

In the burst mode, the adaptive equalization unit of the present embodiments conducts a multiple-stage equalization scheme. First, the received signal is sampled using timing recovery circuitry, matched filtered and is passed through a fixed T/N-spaced equalizer to compensate for the phase and amplitude variations of the link under the operation. When a new burst of a particular link is received in the mesh topology (multi-point to multi-point), the weights of the fixed equalizer for that link are updated based on the tap coefficients of an equalizer that has operated on the previous burst of the corresponding link. In this embodiment, the (2K+) tap coefficients, $C_{i,j}(n)$, of the fixed equalizer are loaded from a memory unit into a T/M-spaced equalizer. That is, in the present embodiments, each node has N sets of tap coefficients stored in its local memory corresponding to its N neighboring nodes, $$C_{i,j}(n) = [c_{i,j}(-K,n) \ c_{i,j}(-K+1,n) \ldots c_{i,j}(K,n)]^T,$$

for $i=1,\ldots,N$, and $n,j=0,1,$

The present embodiments provide a novel and improved method and system for adaptive equalization. The amplitude and delay distortion compensation is conducted in two distinct modes. The first mode is the join mode where a new node is invited to join a mesh radio system. In this mode, the tap coefficients, $C_{i,j}(n)$, of the equalizer of the $j^{th}$ burst of $i^{th}$ neighboring node at time n is estimated through a long sequence of known training symbols. This mode of operation is referred to as the acquisition mode.

In the second mode, the adaptive equalizer is used when the mesh infrastructure is in a burst or steady-state operation. The focus of this discussion is primarily on this mode of the adaptive equalization. Although there are a number of traditional linear and non-linear adaptive equalizers (i.e., LMS transversal, decision feedback, zero forcing, etc.) available and cited in the literature, the present embodiments utilize a novel multi-stage structure to efficiently operate with a short-burst modem within the existing mesh network capable of link hoping on a burst-by-burst basis.

FIG. 1 is a block diagram of an exemplary wireless radio network 100 employing a mesh topology. The network 100 as illustrated in FIG. 1 includes a first node 102, a second node 104, a third node 106 and a fourth node 108 in radio communication. The network 100 may include any number of nodes. The four nodes shown in FIG. 1 are exemplary only. In the embodiment of FIG. 1, the network 100 is a wireless mesh topology network of the type described in U.S. patent application Ser. No. 09/187,665, entitled "Broadband Wireless Mesh Topology Networks" and filed Nov. 5, 1998 in the names of J. Berger and I. Aaronson.

Each node 102, 104, 106, 108 includes data processing apparatus and a radio for communication of data with remote radios, such as other nodes of the network 100. Each node in the exemplary embodiment includes a directional antenna that provides radio communication on a number of sectors. The sectors provide radio coverage over a portion of the geographic area near a node. Thus, node 104 includes sectors 112 providing coverage over an area 116 which includes node 102. Node 102 provides coverage over an area 114. Node 106 provides coverage over an area 118, and node 108 provides coverage over an area 120.

Nodes 102, 104, 106, 108 of the network 100 are considered peers. They are free to communicate with one another on an equal basis. This is in distinction to a hierarchical system such as base stations communicating with subscriber units in a cellular radiotelephone system. Communication among the nodes 102, 104, 106, 108 is peer-to-peer communication.

Two nodes are in radio communication when their antenna sectors align. In that case, the nodes may complete a radio link and exchange data and control information. Thus, node 102 and node 104 communicate on link 128, node 102 and node 108 communicate on link 126, and node 104 and node 108 communicate on a link 134.

The fixed broadband wireless network 100 operates in two modes. A first mode is referred to as the acquisition/join mode. A second mode is referred to as the steady-state or burst mode. In the first mode of operation, the present invention obtains an accurate estimate of the initial tap coefficient values of the adaptive equalizer through the R inserted training symbols into the designated slot of the join packet. The join process may be of the type described in U.S. patent application Ser. No. 09/699,582 entitled "Join Process Method For Admitting A Node To A Wireless Mesh Network, filed Oct. 30, 2000 in the names of Y. Kagan, et al.

In the exemplary embodiment of FIG. 1, node 106 may be considered a joining node which is in the process of joining the network 100 including existing nodes 102, 104, 108. The joining node 106 receives invitation packets from the existing nodes 102, 104, 108 and can thus establish radio communication with node 102 on a link 130 with node 103 and on a link 132 with node 108.

Figure 2:
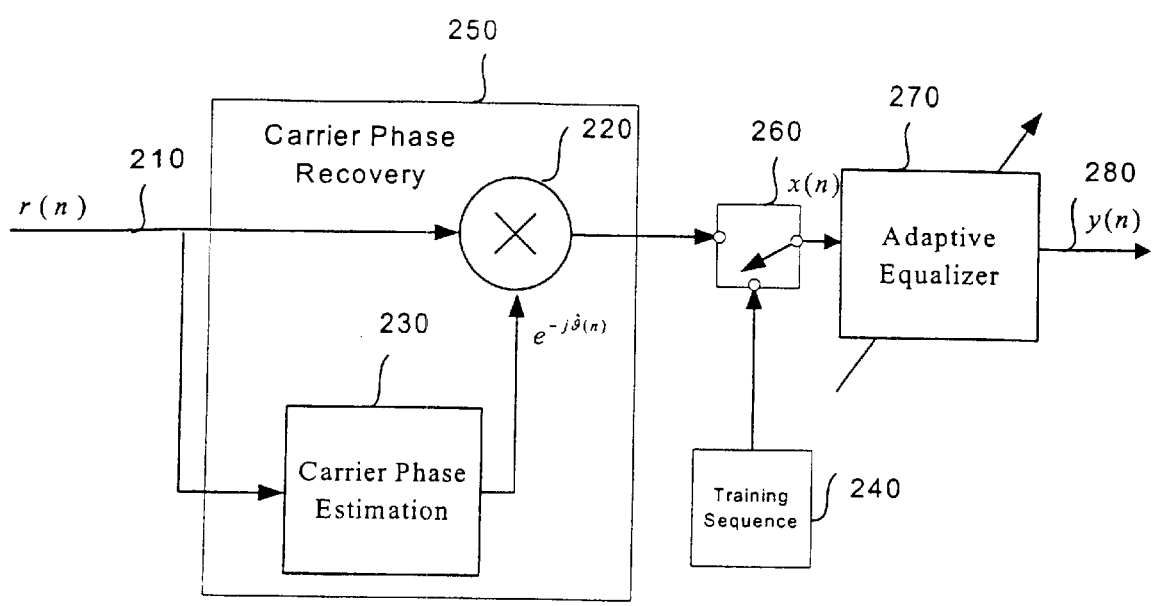
FIG. 2 is a general block diagram of a prior art adaptive equalizer coupled to a carrier phase recovery unit.

System 200 of FIG. 2 is a generic block diagram of a portion of a prior art radio receiver consisting of a carrier phase recovery unit 250 and an adaptive equalizer system 270. System 200 illustrates the operations necessary to recover the carrier phase and compensate for amplitude and delay distortion of the time-varying fading channel in a radio receiver of the system 100. The carrier phase estimator unit 250 can be placed either before or after the adaptive equalizer 270. System 200 is an idealized or canonical representation. Actual embodiments of a system that can accomplish the illustrated operations require an accurate and efficient estimate of $\hat{\theta}(n)$ and $C_{i,j}(n)$ within the context of a multi-hopping link system. The difficulty of forming an effective and efficient embodiment is particularly compounded in the present system where short bursts comprising the pilot signal of two symbols are implemented for system efficiency reasons.

The coherent detection system 200 shown in FIG. 2 includes a carrier recovery unit 230, a complex multiplier 220, a training sequence block 240, a switch 260, and an adaptive equalizer block 270. The system 200 of FIG. 2 receives a signal r(n) which has been already matched filtered and sampled every T seconds.

Other synchronization parameters such as carrier frequency offset, $\hat{f}$, and timing phase offset (symbol epoch), $\hat{\tau}$, are assumed to be known to the receiver. The phase $\hat{\theta}(n)$ is the unknown random process, taking values in the range of $\pm\pi$. Initially, the tap coefficients of the adaptive equalizer can be estimated using a training sequence unit of 240. The carrier phase recovery process may be of the type described in U.S. patent application Ser. No. 09/764,202 entitled "Carrier Phase Recovery System For Adaptive Burst Modems And Link Hopping Radio Networks", filed Jan. 15, 2001 in the names of M. Rafie, et al. That carrier phase recovery process includes a number of stages, including a first stage which acquires a coarse estimate of the distorted carrier phase through a pilot-aided technique using multiple known pilot symbols contained in the present burst of data; a fixed phase bias removal stage coupled to the first stage; a complex conjugate phasor generating stage coupled to the fixed phase bias removal stage; a de-rotating stage for de-rotating the equalized signal by a phasor signal generated by the phasor generating stage to remove estimated coarse carrier phase from the equalized signal to produce a coarse phase compensated signal; a data-aided phase estimator stage for removing modulated signal from the coarse phase compensated signal using a data-aided, decision-directed technique; an averaging stage for averaging M symbols from the data-aided phase estimator stage to reduce noise variance. The symbol epoch and carrier frequency values are estimated in advance and independently of carrier phase and are accurately tracked between bursts.

The received square-root raised-cosine matched filter signal 210, r(n), is input to the carrier phase recovery circuit 230. A multi-stage carrier phase recovery implementation for short burst application of the type described in U.S. patent application Ser. No. 09/764,202 entitled "Carrier Phase Recovery System For Adaptive Modems and Link Hopping Radio Networks", filed Jan. 17, 2001 in the names of M. Rafie, et al. could be used in carrier phase recovery circuit 230. The estimated phase offset, $\hat{\theta}(n)$, is used to form a conjugated complex signal $e^{-j\hat{\theta}(n)}$. Then, estimated phase offset is removed from the received signal 210, r(n), through the complex multiplier operation 220 to generate the equalizer input signal, x(n)

$$x(n)=r(n)e^{j(-\hat{\theta}(n))}.$$

A switch 260 is provided to select a known training sequence for the adaptive equalizer in either acquisition mode or steady-state operation depending on the status of the channel. An adaptive equalizer 270 is coupled to the switch 260 to compensate channel amplitude and delay variations. The requirement for carrier phase offset recovery of the received signal is critical for an acceptable performance of the adaptive equalizer in short-burst modem applications. In continuous (non-bursty) applications, the adaptive equalizer is less sensitive to a phase variation and hence the carrier phase recovery system can be placed after the adaptive equalizer.

As noted above, the system 200 is a canonical form for coherent detection and equalization of the received signal. However, in the system of FIG. 1, radio signals are received as short bursts consisting of short (e.g., two-symbol) pilot signals. Also, the system of FIG. 1 is a link-hopping system in which one radio signal is received on a frequency during certain receive times. The receive times may be interspersed with times during which other signals are received. The embodiments illustrated below relate to a system and method for recovering carrier phase in a link-hopping, burst-mode radio receiver.

Figure 3:
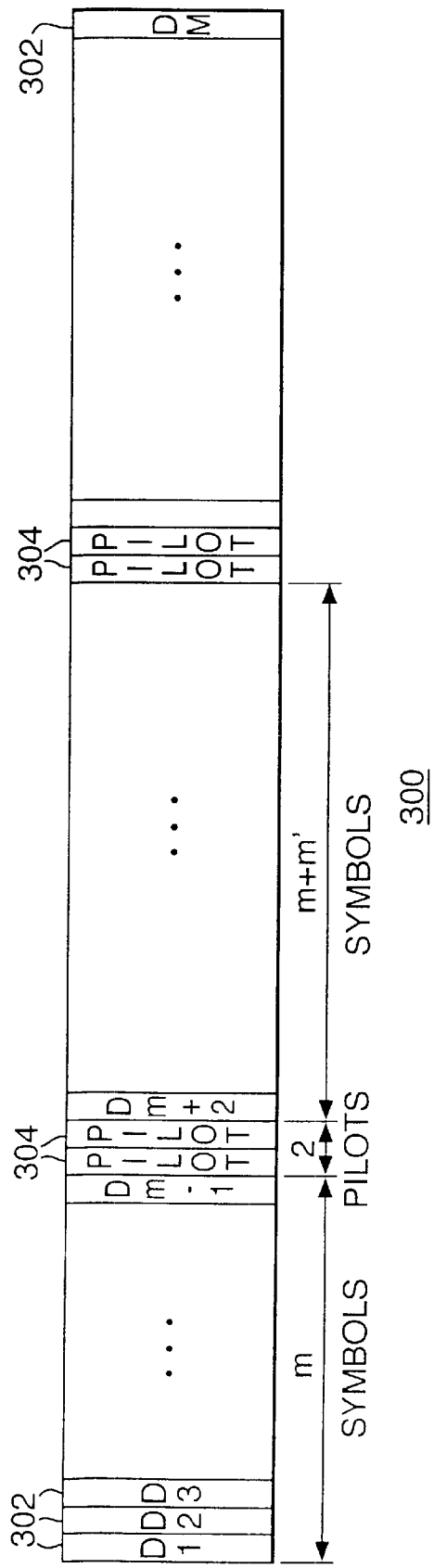
FIG. 3 illustrates a transmitted burst of data in the wireless network of FIG. 1.

In this exemplary embodiment, each burst of data may have the format illustrated in FIG. 3. FIG. 3 illustrates a frame format of a transmitted burst in the wireless network 100 of FIG. 1. The burst in FIG. 3 is of the type used for on-going, burst-mode communication among nodes of the network 100 and is distinct from a burst used in the join process to be described below in connection with FIG. 4. The burst of FIG. 3 is one example of a data burst. As is shown in the data burst 300 of FIG. 3, the steady-state-mode burst includes data symbols 302 and known pilot symbols 304, each at known timing positions inside the data burst. The pilot symbols 304 are inserted between data symbols 302 of the packet data burst 300. Two pilot symbols are used in the illustrated embodiment, but any suitable number could be used. The pilot symbols are chosen to be at maximum amplitude corners of the QAM constellation. As shown in FIG. 3, in the time domain, the pilot symbols may be located near the center of the burst 300. For example in a short burst of 32 symbols, the pilot symbols are located at the sixteenth and the seventeenth symbols, respectively. In the illustrated embodiment, m is the number of data symbols before the inserted pilots per packet and is chosen to be 15. Parameter m' can be any multiple of m. In one embodiment, no other pilot symbols are used (i.e., m=∞). This burst 300 embeds the pilot symbols in the data for reliable phase estimation and data recovery. The carrier phase synchronization system 200 of FIG. 2 uses the inserted pilot symbols and the estimated data symbols to accurately recover the carrier phase offset for the short bursts.

Figure 4:
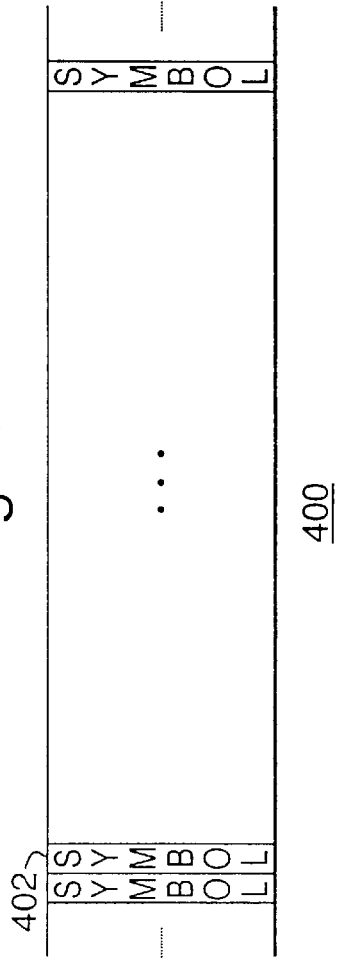
FIG. 4 illustrates a transmitted burst of data of a transmitted invitation packet and a training sequence employed in the join process in the wireless network of FIG. 1.

Similarly, FIG. 4 shows burst 400 of a transmitted invitation packet consisting of training sequence employed in a joining process for the wireless network 100 of FIG. 1. In the join mode, R known training symbols dedicated for the tap weight estimation are multiplexed with other known sequences in the transmitted join frame as shown in FIG. 4.

Figure 5:
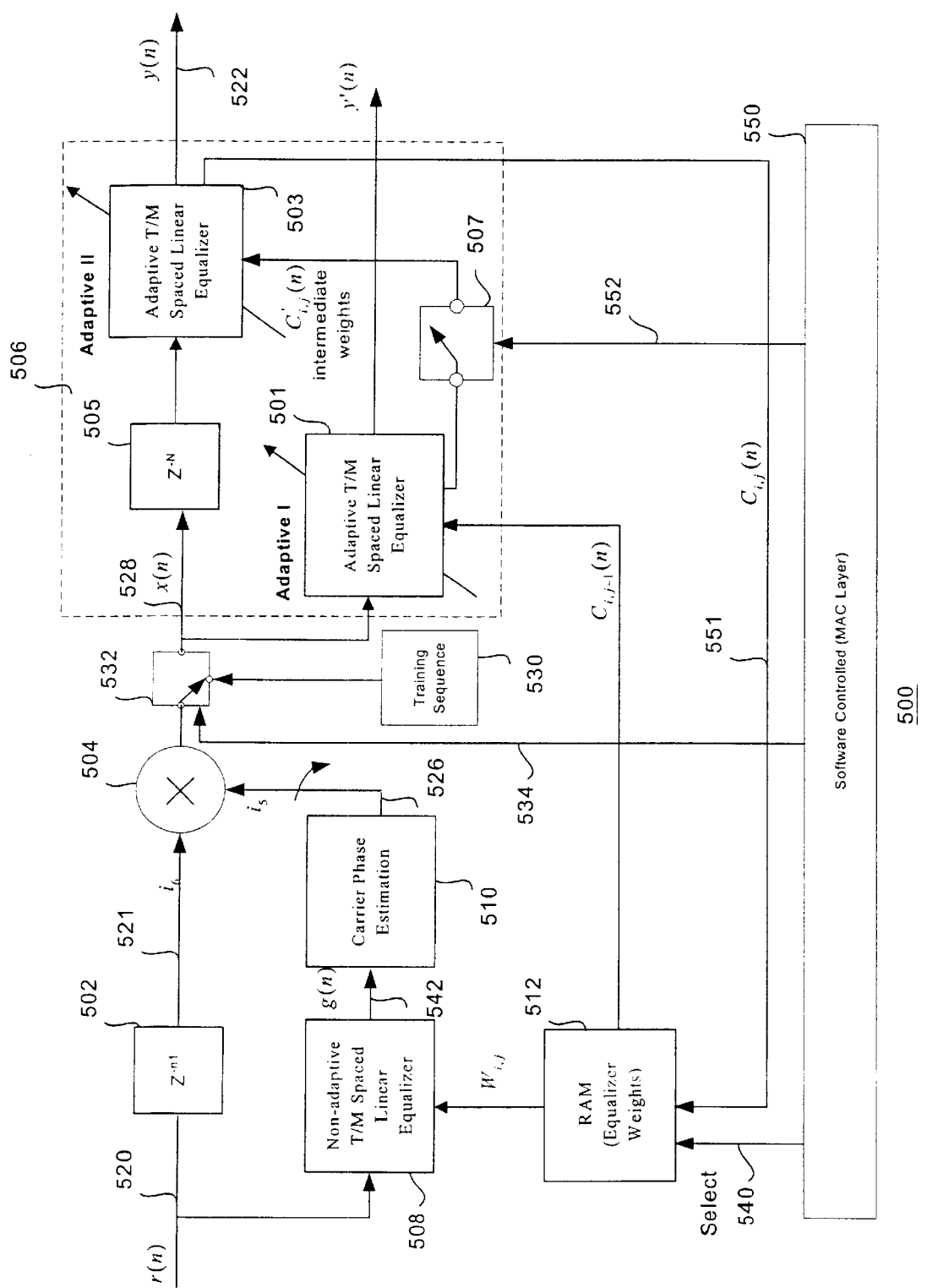
FIG. 5 is a block diagram of an adaptive equalizer system for use in a node of the wireless network of FIG. 1 in a burst-mode operation.

FIG. 5 is a block diagram of an adaptive equalizer system 500 for use in a node of the wireless network of FIG. 1 in a burst-mode operation. The system 500 forms an overall carrier phase recovery system. The system 500 may be implemented in a radio receiver which receives a modulated signal as a series of bursts of data on a plurality of links in a link hopping radio communication system such as the system 100 of FIG. 1. In particular embodiments, each burst may include one or more pilot symbols and data symbols. In one embodiment, the radio receiver including the system 500 operates in the local multipoint distribution service (LMDS) band at 28 GHz on a channel that is slowly changing with time. The radio receiver receives broadcasts of quadrature amplitude modulated (QAM) data. The radio receiver hops among a plurality of radio links to receive bursts of radio signals on the plurality of radio links. Depending on the configuration of the particular network, the bursts received at the receiver on a particular channel from a particular transmitter may be interleaved with bursts from other transmitters on other channels. Applications with other systems having other operational features are possible, as well.

The adaptive equalizer system 500 represents the adaptive equalizer unit for use in a node of the wireless network of FIG. 1. System 500 includes delay elements 502 and 505, a mixer or a complex multiplier 504, an adaptive equalizer 506, a non-adaptive equalizer 508, a carrier phase recovery unit 510 which recovers phase for the present burst of data using pilot and data symbols, switches 532 and 507, and a memory circuit 512. Upon receipt of an initial burst (signal r(n) in FIG. 5) at an input 520, the burst is delayed in the delay block 502. The delayed data (signal i6 in FIG. 5) on line 521 is multiplied in the complex multiplier by a carrier phase estimate signal i5 in FIG. 5 on line 526 from the carrier phase recovery unit 510. The complex multiplier or mixer 504 combines a delayed present burst of data and the recovered phase estimate to produce a phase-error error compensated signal x(n) in FIG. 5 on the line 528. Structure and operation of the carrier phase recovery unit 510 is described in more detail in U.S. patent application Ser. No. 09/764,202, entitled "Carrier Phase Recovery System For Adaptive Burst Modems And Link Hopping Radio Networks," filed Jan. 17, 2001 in the names of M. Rafie, et al., which is incorporated herein by reference in its entirety.

The output signal x(n) from the multiplier 504 is provided on line 528. The signal is provided to a multi-stage adaptive equalizer 506 that compensates for phase and amplitude variations of the channel. The equalizer 506 is composed of a first adaptive equalizer 501, a second adaptive equalizer 503, a delay unit 505, and a switch device 507. The input signal 528 to the adaptive equalizer subsystem 506 is processed through the adaptive equalizers 501, 503 sequentially. The first adaptive equalizer 501 consumes L (i.e., L=32) symbols of signal 528 to generate the initial tap coefficient values, $C'_{i,j}(n)$, for the second adaptive equalizer 503. The generated tap coefficients, $C'_{i,j}(n)=[c'_{i,j}(-K,n)\ c'_{i,j}(-K+1,n)\ ...\ c'_{i,j}(K,n)]^T$, are downloaded to the second adaptive equalizer 503 when the switch 507 is enabled at the $L^{th}$ symbols of the $j^{th}$ received burst of the $i^{th}$ radio link. Operation of the switch is controlled by control signals on a control line 552. The switching function provided by the switch 507 may be provided by hardware components, software or some combination of the two. The tap coefficient set, $C'_{i,j}(n)$, is obtained through $$y'_{i,j}(n) = \sum_{l=-K}^{K} c'_{i,j}(l, n)x_{i,j}(n-l), \text{ for } i=1, ..., N, \quad j, n = 1, 2, ...$$

where N is number of radio links or neighbors of the active node, j is the burst number of the $i^{th}$ radio link, (2K+1) is the number of tap coefficients of each equalizer, and n is the sampling time instant within the $j^{th}$ burst of the $i^{th}$ link.

The input signal 528 to the adaptive equalizer 506 is delayed N samples by the delay unit 505 or equivalently (K+L) symbols before being consumed by the second adaptive equalizer 503. The adaptive equalizer 506 produces an equalized output signal $y_{i,j}(n)$ in FIG. 5. It also provides next burst equalizer weights, $C_{i,j}(n)=[c_{i,j}(-K,n)\ c_{i,j}(-K+1,n)\ ...\ c_{i,j}(K,n)]^T$, to the fixed equalizer 508, where $W_{i,j+1}=C_{i,j}(M)$, M is the length of the $j^{th}$ burst of the $i^{th}$ radio link, and the tap coefficients of the fixed equalizer 508 is $W_{i,j}=[w_{i,j}(-K)\ w_{i,j}(-K+1)...w_{i,j}(K)]^T$. Accordingly, the initial tap values of the adaptive equalizer 501 for equalizing the next burst of data (i.e., $j+1^{st}$ burst) of the $i^{th}$ radio link is $C'_{i,j+1}(0)=C_{i,j}(M)$. Here, the tap coefficients of the adaptive equalizer 503 is obtained based on $$y_{i,j}(n) = \sum_{l=-K}^{K} c_{i,j}(l,n)x_{i,j}(n-n_2-l), \text{ for } i=1,...,N, \quad j, n=1, 2,...$$

where the initial values of the tap coefficients of the adaptive equalizer 503 is set according to $C_{i,j}(0)=C'_{i,j}(L)$. In the illustrated embodiment, L is set to 32, and the next burst equalizer weights are stored in the memory 512 but separate storage may be omitted The equalizer 506 performs a T/M-spaced (i.e., M=2) adaptive equalization process and an equalized and carrier-phase-error compensated signal is produced at the output 522. As part of the adaptive equalization process, equalizer weights are produced by the adaptive equalizer 506 using a complex LMS algorithm.

Figure 6:
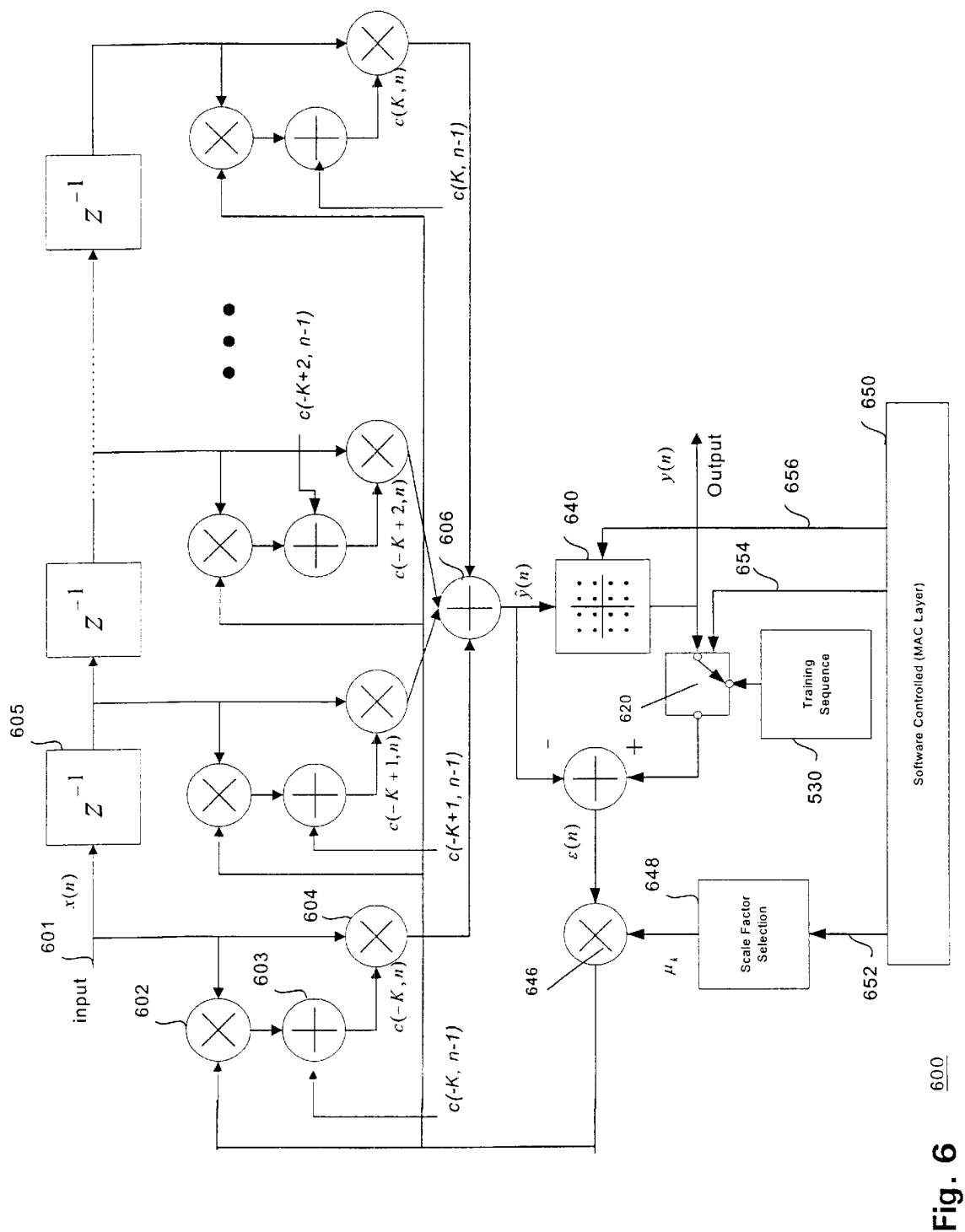
FIG. 6 illustrates a linear adaptive equalizer using a mean square error (MSE) algorithm.

FIG. 6 illustrates the core of a linear adaptive equalizer system 600. The linear adaptive equalizer system 600 implements a LMS equalizing operation. However, the equalizer system 600 is particularly adapted to implement the equalizer 506 of FIG. 5.

The system 600 includes an input 601, delay elements 605, update elements including a multiplier 602, summer 603 and multiplier 604, and a summer 606. The system 600 further includes a slicer 640 a summer 642, a switch 620, a scale factor selector 648 and a multiplier 646. A memory block 530 stores a training sequence 530.

The operational blocks illustrated in FIG. 6 may be implemented using appropriate hardware, software operating in conjunction with hardware elements or a combination of hardware and software. The system 600 operates under control of data and instructions received from the medium access layer (MAC layer) 650 of the receiver incorporating the linear adaptive equalizer system 600. The medium access layer provides scheduling operations, control of resources, and so forth. Since the adaptation required of the linear adaptive equalizer system 600 does not happen relatively rapidly, the operations illustrated in FIG. 6 may be suitably implemented in software under control of the MAC layer 650.

The adaptation algorithm for the equalizers 501 and 503 of FIG. 5 and implemented by the linear adaptive equalizer system 600 is $$c_{i,j}(n+1)=c_{i,j}(n)+\mu_k \in_{i,j}(n) x^*_{i,j}(n),$$

and $$\in_{i,j}(n)=y_{i,j}(n)-\hat{y}_{i,j}(n),$$

where $\mu_k$ is an adaptive scale factor that controls the rate of adjustment of the LMS algorithm. The scale factor, $\mu_k$, is selected out of the Q pre-stored values (i.e., k=1, 2, . . . , Q) in the memory block 630 of FIG. 6. The selection of $\mu_k$ is software controlled and is based on the estimated signal-to-noise ratio, SNR, at the output of the equalizer and other side-channel information provided to the MAC layer 650. The selection of $\mu_k$ may be based on other channel performance factors or information.

To implement the algorithm described above, the system 600 operates as follows. The input signal x(n) is received at the input 601. The input signal is provided to the multiplier 602 and multiplier 604. The multiplier 602 forms the term $\mu_k \in_{i,j}(n) x_{i,j}^*(n)$. The summer 403 adds the term $c_{i,j}(n-1)$ which may be retrieved from a previously accessed storage location. The input signal is also delayed in the delay elements 605 and similar products and sums are formed in the remainder of the update elements of the system 600. The output values from all of the update elements are combined in the summer 606.

The output of the summer 606 is the signal $\hat{y}(n)$. This signal is provided to the slicer 640 for quantization to a constellation. The slicer 640 receives an input signal on a control line 656 which selects the type of modulation currently being used. For example, one value of the input signal may correspond to 16-QAM and a second value of the input signal may correspond to 64-QAM. The output signal y(n) from the slicer is provided at the output of the system 600.

The output signal y(n) is also provided to the switch 620. The switch 620 selectively provides the output signal y(n) to one of the summer and the memory block 530 as a stored training sequence. The switch operates in response to a control signal received on a line 654 from a control circuit such as the MAC layer 450. The training sequence may be stored at beginning of operation of the receiver in a system.

The summer combines the un-quantized slicer input signal $\hat{y}(n)$ and the quantized slicer output signal y(n) to form the error signal $\in(n)$. Here, $\in(n)=y(n)-\hat{y}(n)$. The output signal is quantized by the slicer 640 to a constellation point but maybe not the correct constellation point. The input signal is not quantized to a constellation point. The operation of the system tends to reduce $\in(n)$. A bigger error produces a bigger correction. Thus, when the error signal $\in(n)$ is multiplied by the selected scale factor, the product tends to produce a correction associated with the size of the error. The scale factor is selected from the scale factor selector by a control signal received on control line 652.

A programmable equalizer training sequence (ETS) for the wireless network of system 100 of FIG. 1 is also provided to assist the convergence of the adaptive equalizers 501 and 503 of FIG. 5 in situations where the data packets are less frequently present in the mesh radio network. In one embodiment, the frame construction of a transmitted ETS is shown in FIG. 7. In the illustrated embodiment of FIG. 7, ETS signal 710 of length I is generated at time T. Short control signal packets 720 and 730, request to send (RTS) and clear to send (CTS), respectively, are inserted periodically within every radio link with a periodicity of P milliseconds shown in FIG. 7. Based on the channel condition and the equalizer performance (SNR measurement), a known ETS signal is inserted every S·P milliseconds. In one embodiment of the present invention, a value of S=5 is assumed. The ETS signal is heavily used for reliable estimation of receiver signal strength indication (RSSI) and SNR metrics required for automatic transmit power control (ATPC). ATPC is critical for management of inter- and intra-system interference scenarios.

Referring again to FIG. 5, the equalizer weights of block 506 in FIG. 5 correspond to the particular link from which received radio signals are currently processed. The adaptive equalizer 506 along with the fixed equalizer 508 and the carrier phase recovery unit 510 structure compensate for amplitude and carrier phase variations in the channel and/or provides appropriate channel side information for each radio link from the received burst on the radio link.

The equalizer weights, channel phase or other determined channel information are stored in the memory 512 of FIG.

5. In the illustrated embodiment, the memory 512 is a random access memory. In alternative embodiments, other storage devices may be substituted. In a link-hopping network embodiment, such as the network 100 of FIG. 1, the equalizer weights are preferably stored in accordance with an indication of the link with which they are associated. In this manner, in response to a select signal received at an input of the memory 540, the equalizer weights, $W_{i,j}$, may be retrieved from the memory 512 for use in equalization of a subsequent burst. When each subsequent burst for a particular link is received, the adaptive equalizer 506 updates the equalizer weights for the next received burst using the current equalizer weights. The iterative adaptive equalizer 506 then stores the updated equalizer weights in the memory 512.

The fixed equalizer 508 of FIG. 5 receives the stored equalizer weights as signal $W_{i,j}$ from the memory 512. As noted, in a multiple-link or link-hopping system, the stored equalizer weights are preferably retrieved from the memory according to the link to be received. The equalizer 508 uses the equalizer weights or other determined channel information for the radio link to reliably receive a next received burst on the radio link. That is, when the next burst for that particular link is received, the select signal is asserted at the input 540 to the memory 512 to retrieve the equalizer weights previously stored for the link. The fixed equalizer 508 pre-compensates amplitude and delay distortions of the channel using the retrieved equalizer weights of the adaptive equalizer 506. The equalized signal $$g_{i,j}(n) = \sum_{l=-K}^{K} w_{i,j}(l) r_{i,j}(n-l)$$

is provided to the carrier phase recovery unit 510 on a line 542.

The delay block 502 in FIG. 5 is provided to account for all processing delays encountered in the fixed equalizer 508 and the carrier phase recovery unit 510, respectively.

In a multiple link environment, the system 500 of FIG.5 may receive bursts over several independent channels from different receivers. At some times, the system 500 may receive multiple bursts or a continuous transmission from a single transmitter. In the general case, though, the system 500 receives one burst from one transmitter on a first channel and subsequently, a second burst from the same transmitter on the same first channel. Bursts from one or more other transmitters are interspersed between the first and second bursts on the channel.

The system 500 thus receives a first burst of a first radio signal on a first radio link. For example, in FIG. 1, the node 102, which includes the system 500 in this example, may receive a burst on link 126 from node 108. The system 500 stores the equalizer weights, carrier phase or other channel information. The system 500 then receives a first burst of a second radio signal on a second radio link, such as the link 128 in FIG. 1. The system 500 determines channel information about the second radio link using the first burst of the second radio signal. The channel information for the second radio link is stored. Subsequently, the system 500 receives a next burst of the first radio signal on the first radio link, such as link 126 in FIG. 1, using the equalizer weights or other channel information.

In the joining process, a new or joining node is added to an existing network of one or more nodes. For example, in the exemplary embodiment shown in FIG. 1, if node 106 is a joining node which is joining the network 100 which already includes node 102, 104, 108, node 106 must locate radio signals from other nodes in the network 100, including locating direction and frequency of the radio signals. Further, the node 106 must acquire timing synchronization with the other nodes using the radio signals. Still further, the joining node 106 must initiate communication with one or more existing nodes so that its presence can be recorded in the network.

Referring again to FIG. 4, a burst 400 includes all training symbols 402 in one embodiment. The burst 400 is of duration R known symbols, where R may be any selected number. Transmitting only known symbols with desirable statistical properties simplifies the joining process at the joining receiver. However, in alternative embodiments, other frame structures including other data content may be substituted. The frame structure 400 thus forms an invitation burst having data symbols and known training symbols at a known timing position inside the invitation packet.

In conjunction with the system shown in FIG. 5, the data burst 400 of FIG. 4 may be used in the join process of the adaptive equalization to fill the memory 512 with initial stored tap coefficient values for the fixed equalizer and the first adaptive equalizer, respectively. That is, the first burst generally received by the system 500 in a joining node wishing to join the network is an invitation burst as illustrated in FIG. 4. After equalization by the adaptive T/M-spaced equalizer 506 of FIG. 5, the equalizer weights are stored in the memory. The equalizer weights form link parameters for the new radio link from an established node in the network to the joining node. The link parameters or equalizer weights are stored as initial channel information. Upon receipt of subsequent bursts, the link parameters may be updated. If either another invitation burst or a data burst is received from the established node on the new radio link, the stored tap weights may be updated with new equalizer weights which reflect variation in the channel.

From the foregoing, it can be seen that the present embodiments provide a method and apparatus for adaptive equalization means in a burst-mode system. Information about the radio link, such as equalizer weights appropriate for the link, is stored for subsequent use in a receiver. For adaptive equalization, first a fixed equalizer is used to pre-compensate the amplitude and delay distortion of a slow-varying channel. A coarse phase estimate is made of the carrier phase recovery unit using pilot symbols of the received data. The coarse estimated is then used for making a fine estimate in a data-directed carrier phase recovery technique. Finally, an iterative adaptive equalizer consisting of two adaptive fractionally-spaced equalizers are used to compensate the channel amplitude and delay impairment in a short-burst and mesh network architecture.

While a particular embodiment of the present invention has been shown and described, modifications may be made. The operational blocks shown in the block diagrams of the drawing may be embodied as hardware components, software code operating in conjunction with hardware, or a combination of the two. Implementation of such functions in hardware, software or a combination thereof is well within the purview of those ordinarily skilled in the appropriate art. Further, such illustrated functionality may be combined with other operations by way of modification. Accordingly, it is therefore intended in the appended claims to cover such changes and modifications which follow in the true spirit and scope of the invention.

What is claimed is:

1. A method for receiving and decoding burst radio signals from multiple sources, the method comprising:

receiving bursts of radio signals on a plurality of radio links in a radio system;

compensating amplitude and delay distortions for each radio link from a received burst on the plurality of radio links using a non-adaptive equalizer, a first adaptive equalizer I, a second adaptive equalizer II, the equalizers being K/M fractionally-spaced, K and M being integers and K≦M;

pre-equalizing a received burst of a radio link using the non-adaptive equalizer, wherein tap coefficients of the non-adaptive equalizer are obtained from the adaptive equalizer II operated on a previous received burst of the radio link;

estimating and removing carrier phase offset for the received burst;

estimating initial tap coefficient values of the adaptive equalizer II using the first adaptive equalizer I operating on the current burst of a present radio link;

adaptively equalizing a delayed version of the current burst using the adaptive equalizer II with the estimated tap coefficient values;

storing the estimated tap coefficient values of the adaptive equalizer II into a memory unit at the end of the current burst of the operating radio link; and retrieving stored tap coefficients of an adaptive equalizer II from the memory unit into the non-adaptive equalizer to pre-compensate any residual amplitude and delay distortion of a next received burst on each radio link.

2. The method of claim 1 further comprising:

pre-compensating amplitude and delay distortions of a received burst in a non-adaptive, K/M fractionally-spaced equalizer for each radio link using stored tap coefficients of a previous burst of the respective radio link.

3. The method of claim 1 further comprising:

compensating for the carrier phase offset of the received bursts of radio signals;

estimating carrier phase of each link using available pilot and data symbols in a received burst.

4. The method of claim 1 further comprising:

providing the initial tap coefficient values for the second adaptive, fractionally-spaced equalizer II from an adaptive, K/M fractionally-spaced equalizer I.

5. The method of claim 1 further comprising:

in the second adaptive equalizer II, using the initial tap coefficient values of the first adaptive equalizer I as initial coefficient weights to equalize a delayed and carrier phase compensated received burst on a radio link of the plurality of radio links.

6. The method of claim 5 further comprising:

using resulting equalizer tap coefficient values at the end of a current burst of a respective radio link of the second adaptive equalizer II as the initial tap coefficient values for a next data burst in the non-adaptive equalizer on the radio link.

7. The method of claim 5 further comprising:

using resulting equalizer tap coefficient values at the end of a current burst of a respective radio link of the second adaptive equalizer II as initial tap coefficient values for a next data burst in the first adaptive equalizer I on the radio link.

8. The method of claim 1 wherein receiving bursts of radio signals comprises:

receiving one of a data burst in the steady-state operation and multiple invitation packets on radio links associated with neighbors in the radio system for each joining new neighbor in a join operation.

9. The method of claim 8 further comprising:

receiving a programmable equalizer training sequence (ETS) multiplexed with a data burst every S programmable frames per radio link, wherein each respective invitation packet comprises known training symbols at a known timing position in the respective invitation packet.

10. The method of claim 9 wherein receiving the programmable ETS comprises:

periodically multiplexing a maximum-length shift-register (MLSR) code sequence with good correlation properties positioned at the beginning of every S frames with a known modulation format.

11. The method of claim 9 further comprising adapting tap coefficients using a plurality of known code sequences per each received ETS burst at the beginning of each Sth frame to allow the equalizer to follow changing channel characteristics and to minimize the lag error in the LMS (least-mean square) algorithm per respective link.

12. The method of claim 8 further comprising:

after receiving S frames, receiving an ETS burst multiplexed with the transmitted frame structure for each link among the plurality of radio links; and training the tap coefficients of the first adaptive equalizer I and the second adaptive equalizer II using a received data burst.

13. The method of claim 8 further comprising:

compensating for amplitude and delay distortion of radio link; and demodulating the received burst using a known training sequence.

14. The method of claim 13 wherein demodulating comprises:

estimating channel phase and amplitude variations from the known training sequence in the invitation packets during the join operation;

estimating channel phase and amplitude variations from ETS sequences in the steady-state operation;

adapting tap coefficients in a decision-directed mode using data bursts in the steady-state operation; and detecting processed symbols based on a selected modulation scheme M-QAM.

15. The method of claim 1 further comprising:

receiving an invitation burst for a radio link with a new joining node joining the radio system;

retrieving stored equalizer weights obtained using the invitation packet in the first adaptive equalizer I and obtaining an estimate of tap coefficients as the initial tap coefficient values for steady-state operation of the second adaptive K/M-spaced equalizer II; and retrieving stored equalizer weights obtained using the invitation burst into a non-adaptive, K/M-fractionally-spaced equalizer for pre-processing a data burst before the carrier phase recovery unit.

16. The method of claim 1 further comprising:

establishing link parameters for a radio link with a new joining node joining the radio system; and storing the link parameters as initial stored channel information for steady-state operation.

17. The method of claim 1 further comprising:

compensating carrier phase for a data burst by forming an estimate of carrier phase based on the pilot and data symbols in the data burst;

loading the tap coefficient values of the first adaptive equalizer I after L symbols into a second adaptive equalizer II as initial tap coefficient values of the second adaptive equalizer II;

updating and adapting the tap coefficient values for the second adaptive equalizer II using a (K+L) symbol delayed version of the current data burst in a decision-directed mode operation;

freezing the tap coefficient values of the first adaptive equalizer I after the Lth symbol in the burst and providing them to the second adaptive equalizer II;

resuming adaptation of the tap coefficient values of the first adaptive equalizer as soon as a new data burst is received;

storing the tap coefficient values of the second adaptive equalizer II into a memory block after all symbols of the current burst are processed; and using the stored equalizer weights in the non-adaptive equalizer for pre-processing the data burst for carrier-phase recovery preceding the first adaptive equalizer I and the second adaptive equalizer II.

18. The method of claim 1 wherein estimating carrier phase offset comprises:

estimating carrier phase of the bursts of radio signals using a coarse-compensated amplitude and phase distorted radio signal burst.

19. The method of claim 1 wherein estimating and removing carrier phase offset comprises:

removing impact of carrier phase due to channel impairments to improve convergence of the tap coefficients of the first adaptive equalizer I to an acceptable mean-square error value.

20. The method of claim 19 further comprising:

varying a gain parameter of a least-mean square process in the first adaptive equalizer I and the second adaptive equalizer II based on one or more measured channel quality parameters.

21. The method of claim 20 wherein the one or more measured channel quality parameters comprises received signal strength (RSSI) and signal to noise ratio (SNR).

22. The method of claim 1 wherein estimating and removing carrier phase offset comprises:

receiving at a second adaptive equalizer II a delayed signal from a carrier phase recovery unit, the delayed signal representing the bursts of radio signals from which the impact of carrier phase due to channel impairments is removed; and using the delayed signal at the second adaptive equalizer II to converge the tap coefficients of the second adaptive equalizer II to an acceptable mean-square error value.

23. A method for receiving radio signals in a link-hopping, burst mode radio receiver, the method comprising:

receiving a first burst of a first radio signal on a first radio link;

determining equalizer weights for a first adaptive equalizer I about the first radio link using the first burst;

subsequently, receiving a next burst of the first radio signal on the first radio link using the equalizer weights obtained in the first burst as initial tap coefficient values;

storing equalizer weights of a second adaptive equalizer II at the end of the current burst to be used in a fixed equalizer to pre-compensate for amplitude and phase variations of received signals;

receiving a first burst of a second radio signal on a second radio link; and determining equalizer weights for the second radio link using equalizer weights obtained in the first burst of the second radio signal as initial tap coefficient values of the first burst of the second radio signal;

wherein receiving the first burst of the second radio signal comprises:

determining channel information for the second radio link and storing equalizer weights for the second radio link for subsequent use; and using the stored information as initial equalizer weights of the first equalizer for a second burst of the second radio signal.

24. A method for receiving radio signals in a link-hopping, burst mode radio receiver, the method comprising:

receiving a first burst of a first radio signal on a first radio link;

determining equalizer weights for a first adaptive equalizer I about the first radio link using the first burst;

subsequently, receiving a next burst of the first radio signal on the first radio link using the equalizer weights obtained in the first burst as initial tap coefficient values; and storing in a memory circuit coupled to the second adaptive equalizer II next burst equalizer weights for the fixed equalizer and the adaptive equalizer I on a present radio link;

wherein determining the equalizer weights comprises downloading to a fixed equalizer complex coefficients from a second adaptive equalizer II for the first radio signal.

25. An adaptive, fractionally-spaced equalizer method for use in a multiple-link hopping, burst adaptive modem, the method comprising:

receiving an amplitude and phase distorted complex signal as a series of bursts, each burst including one or more pilot symbols and data symbols;

pre-compensating for amplitude and phase variations of the received complex signal using a fixed, fractionally-spaced equalizer;

forming an estimation of carrier phase using a coarse estimation of carrier phase to estimate carrier phase for a burst using pilot and data symbols of the burst;

estimating initial tap values of the second adaptive equalizer using a first adaptive equalizer I after an integer number of symbols; and equalizing the delayed version of the input received signal of the first adaptive equalizer in a second adaptive equalizer II.

26. An adaptive equalizer system for use in a link hopping burst adaptive modem in steady state operation, the system comprising:

a random access digital memory with a plurality of storage locations that are predefined for multiple radio links and storing the tap coefficient values for the respective radio links;

a fixed equalizer for pre-compensating amplitude and phase variations of a present data burst of a present link through the fixed equalizer for which the tap coefficient values pertinent to a previous burst of the present link are loaded from the memory, the fixed equalizer producing a pre-compensated amplitude and phase signal;

a carrier phase recovery unit extracting distorted carrier phase for a plurality of communication links, the carrier phase unit including:

a first stage which acquires a coarse estimate of the distorted carrier phase through a pilot-aided technique using multiple known pilot symbols contained in the present burst of data;

a fixed phase bias removal stage coupled to the first stage;

a complex conjugate phasor generating stage coupled to the fixed phase bias removal stage;

a de-rotating means for de-rotating the equalized signal by a phasor signal generated by the phasor generating stage to remove estimated coarse carrier phase from the equalized signal to produce a coarse phase compensated signal;

a data-aided phase estimator stage for removing modulated signal from the coarse phase compensated signal using a data-aided, decision-directed technique;

an averaging means for averaging M symbols from the data-aided phase estimator stage to reduce noise variance;

a first adaptive equalizer I unit for generating initial tap coefficient values for a second adaptive equalizer II which produces an equalized signal and stores tap coefficient values of the second adaptive equalizer II at the end of the current burst in the memory to be used as the tap coefficient values of a fixed equalizer for the next burst of a respective radio link.

* * * * *